(12) United States Patent
Ljubicich (10) Patent No.: US 6,990,189 B2
(45) Date of Patent: Jan. 24, 2006

(54) TECHNIQUE FOR PROVIDING INFORMATION ASSISTANCE WHILE MAINTAINING CONNECTION INFORMATION ANONYMITY

(75) Inventor: Philip A. Ljubicich, Lake Forest Park, WA (US)

(73) Assignee: Metro One Telecommunications, Inc., Beaverton, OR (US)

( * ) Notice: Subject to any disclaimer, the term of this patent is extended or adjusted under 35 U.S.C. 154(b) by 321 days.

(21) Appl. No.: 10/403,131

(22) Filed: Mar. 31, 2003

(65) Prior Publication Data

US 2004/0190707 A1 Sep. 30, 2004

(51) Int. Cl.
*H04M 3/42* (2006.01)

(52) U.S. Cl. .............................. 379/218.01; 379/201.01
(58) Field of Classification Search ............ 379/218.01, 379/201.01
See application file for complete search history.

(56) References Cited

U.S. PATENT DOCUMENTS

2004/0098625 A1 * 5/2004 Lagadec et al. ............ 713/201
2004/0166832 A1 * 8/2004 Portman et al. ......... 455/412.1

* cited by examiner

*Primary Examiner*—Creighton Smith
(74) *Attorney, Agent, or Firm*—Kaye Scholer LLP (57) ABSTRACT

In accordance with the invention, an indication of connection information anonymity is stored for each individual or entity that wants to have access information made available in response to a request for directory assistance respecting such individual or entity, but does not want their actual telephone number disclosed. The information assistance service may be accessed by a user using a wireline telephone, wireless telephone, personal digital assistant (PDA) or other communications device seeking information assistance. An operator (or automated unit) who attends to such an information assistance service receives a request for information assistance respecting a researched party whose connection information is designated anonymous, and transmits to the user an access telephone number which enables the user to call a researched party, without however providing the user with the actual telephone number of the researched party. Such information may be transmitted to the user via a short message service (SMS) or a wireless application protocol (WAP). It may also be transmitted by facsimile, email, paging, instant messaging, web connection or other communications.

60 Claims, 5 Drawing Sheets

USER PROFILE

| SEARCHED NAME (310) | SEARCHED LOCATION (315) | SEARCHED TELEPHONE NUMBER (320) |
|---|---|---|
| HART, JAKE (301) | NEW YORK, NY | 212-822-1010 |
| LANDON, AMY (302) | NEW YORK, NY | 212-722-8270 |

| SEARCHED NAME (310) | SEARCHED LOCATION (315) | ACCESS TELEPHONE NUMBER (420) |
|---|---|---|

TECHNIQUE FOR PROVIDING INFORMATION ASSISTANCE WHILE MAINTAINING CONNECTION INFORMATION ANONYMITY

FIELD OF THE INVENTION

The invention relates to a communications system and method, and more particularly to a system and method for providing information assistance including providing information for accessing a researched party without disclosing certain information respecting the researched party.

BACKGROUND OF THE INVENTION

It is a common experience to call an operator for directory assistance information. In a typical directory assistance call, a caller identifies to the operator the name and address (sometimes city or area code) of a party whose telephone number is desired. In response, the operator locates the desired destination number using, e.g., a computer database. The destination number is then provided to the caller, e.g., by a computerized voice server which provides automated voicing of the number.

Presently, directory assistance systems typically provide callers with connection information (such as the telephone number) of a researched party in response to a directory assistance request. By providing such information, anonymity of the researched party's destination telephone number is broken.

Although some directory assistance systems can connect callers directly to a desired party in response to a request for directory assistance (and thereby obviating the need to convey the researched party's telephone number to the caller), these systems nevertheless typically provide the caller with the telephone number associated with the called party. Further, even if a directory assistance operator connects the caller to a researched party without providing the caller with any connection information (such as telephone number) respecting the researched party, and thereby maintaining the anonymity of the researched party's telephone number, the caller must connect a directory assistance operator and make a request for directory assistance each time the caller wants to call the researched party.

Another way in which anonymity of connection information respecting a researched party is maintained is by allowing parties to designate their telephone numbers as "unlisted." By designating a telephone number as an unlisted number, the directory assistance operator is notified that neither a desired party's telephone number should be provided to callers, nor should the operator connect the caller to the researched party. This prior art technique, however, has a drawback. Although the researched party's telephone number remains anonymous, callers are precluded from contacting the researched party using directory assistance until the researched party terminates the designation of the telephone number as "unlisted."

SUMMARY OF THE INVENTION

We have recognized a need to provide a user seeking connection information respecting a researched party with the ability to access such information, but without disclosing the party's actual connection information (such as actual telephone number). This may be accomplished by providing a user to an information assistance provider with a system access telephone number (instead of a party's actual telephone number), in response to a search request for directory assistance. With this access telephone number, the information assistance provider can connect the user with the researched party, without disclosing the researched party's actual telephone number. Thus, although a user may establish a connection with the researched party, the user is not provided with the party's actual telephone number, and the researched party's connection information therefore remains anonymous.

Thus, with the invention, a method and system for providing information assistance includes receiving a call from a user, wherein the call includes a request for connection information concerning a researched party. Connection information and access information are retrieved in response to the request. The access information—which enables the user to effectuate a connection between the user and the researched party through a provider of the information assistance—is then transmitted to the user yet the connection information is withheld from the user.

In accordance with another embodiment of the invention, a method and system for connecting a user to a researched party, through a provider of information assistance, includes receiving an identifier associated with the user and a request from the user to establish a communications connection with the researched party. Connection information is then identified, based on the identifier, wherein the connection information was previously requested by the user and undisclosed thereto by the provider, and the user is connected with the researched party, using the connection information.

BRIEF DESCRIPTION OF THE DRAWINGS

Further objects, features and advantages of the invention will become apparent from the following detailed description taken in conjunction with the accompanying drawing showing an illustrative embodiment of the invention, in which.

DETAILED DESCRIPTION

The invention is directed to a system and method for providing a user with information which enables the user to call a researched party without, however, providing the user with the researched party's actual telephone number. A "researched party" is an individual or entity for which a user to an information assistance provider requests connection information (such as the party's telephone number) or some other type of information relating to that individual or entity.

A well known technique for providing directory assistance service, which enables a user to call a researched party, is by providing the user with the researched party's telephone number in response to a request for such information provided that it is listed. This prior art technique, however, has a drawback. Certain individuals and entities do not want their telephone numbers disclosed to users accessing directory assistance service.

Some of these individuals and entities nevertheless want to provide users who access a directory assistance service with information that enables the user to contact them without, however, being provided with the researched parties' actual telephone number. In accordance with an embodiment of the invention, users are able to access a directory assistance service to call a researched party, while the researched party's actual phone number is not discovered (or remains anonymous). In accordance with an embodiment of the invention, when a researched party's telephone number or other connection information is designated "anonymous," such number or information is not displayed or otherwise provided to the user of an information assistance service.

In accordance with the invention, an indication of connection information anonymity is stored for each individual or entity that wants to have access information made available in response to a request for directory assistance respecting such individual or entity, but does not want their actual telephone number or connection information disclosed. The information assistance service may be accessed by a user using a wireline telephone, wireless telephone, personal digital assistant (PDA) or other communications device. An operator who attends to such an information assistance service transmits to the user an access telephone number (e.g., an 800-xxx-xxxx telephone number, 10-10-xxx-xxxx telephone number or other generic telephone number) which enables the user to be connected with a researched party through a directory assistance provider, without however providing the user with the actual telephone number of the researched party. Such information may be transmitted to the user via a short message service (SMS) or a wireless application protocol (WAP). It may also be transmitted by other types of wireless telephones, landline telephones, facsimile, email, paging, instant messaging, web connection or other communications.

The term "operator" used herein broadly encompasses entities that are capable of providing information assistance in a communication environment, including without limitation human operators, voice response/recognition capabilities, web-or WAP-enabled operator services, and other electronic access.

Figure 1:
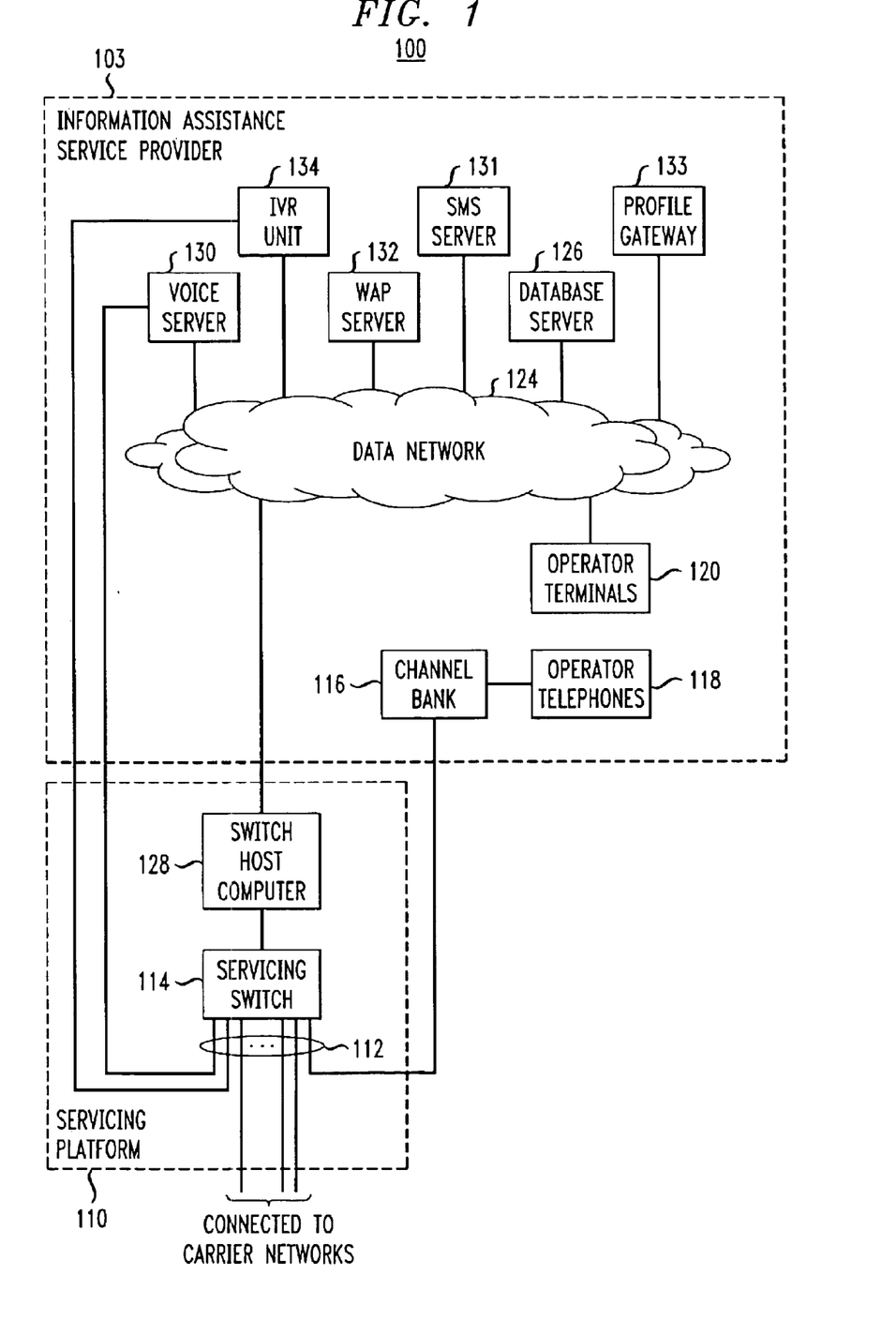
FIG. 1 illustrates an information assistance system, in accordance with the invention.

FIG. 1 illustrates information assistance system 100 embodying the principles of the invention. In this illustrative embodiment, users of a particular telephone carrier may dial, speak or otherwise communicate predetermined access digits, access codes or retail numbers, or input a predetermined address or URL established by the carrier to access information assistance service provider 103. For example, the predetermined access digits may be "411," "*555," "555-1212," "00," etc. On learning one such access digit sequence initiated from a user's communications device, a switching system of the user's telephone carrier in a conventional manner routes the information assistance call to provider 103 through servicing platform 110.

It should be noted that even though both provider 103 and servicing platform 110 appear in the same figure, they may or may not be located in the same geographic area. In FIG. 1, servicing platform 110 comprises servicing switch 114 having T1 spans 112 for connection to voice server 130, channel bank 116, and carrier networks. Switch 114 may receive an incoming information assistance call from one of the carrier networks through a carrier switch therein. It may also be used to place an outgoing call through one of the carrier networks which may be different than that used for the incoming call.

Channel bank 116 in provider 103 is used to couple multiple operator telephones 118 to switch 114. The operators in system 100 are further equipped with operator terminals 120, each of which includes a video display unit and a keyboard with associated dialing pad. Operator terminals 120 are connected over data network 124 to one or more database server(s) 126 (although only one is shown here). Switch host computer 128, voice server 130, SMS server 131, WAP server 131, interactive voice server (IVR) unit 134, and profile gateway 133 are also connected to data network 124. By way of example, data network 124 includes a local area network (LAN) supplemented by a number of point-to-point data links. Through data network 124 and routers (not shown), components of system 100, e.g., SMS server 131, WAP server 132, may also be connected to the Internet.

System 100 may receive an incoming information assistance call from one of the carrier networks through a carrier switching center therein. It also places outgoing calls through one of the carrier networks which may be different than that used for the incoming call.

Switch 114 is conventional and supports digital T1 connectivity. The operation of switch 114 is governed by instructions stored in switch host computer 128. In this illustrative embodiment, switch 114 includes, inter alia, arrays of digital signal processors (DSPs). These DSPs can be programmed and reprogrammed to function as, among other things, call progress analyzers (CPAs), call progress generators (CPGs), multi-frequency (MF) tone generators/detectors, dual-tone multi-frequency (DTMF) generators/detectors, or conference units, depending on the demand placed on system 100 and switch 114 for each corresponding function.

An incoming information assistance call from a user is received by switch 114 in system 100 which connects it to an available operator's telephone. If no operator is available when a call is received, the call is queued in a conventional manner until an operator becomes available. In this instance, automatic call distribution (ACD) logic of conventional design (not shown) is used to queue and distribute calls to operators in the order in which they are received, and such that the call traffic is distributed evenly among the operators. The ACD logic may reside in host computer 128 or elsewhere in system 100. In other instances, other distribution logic schemes may be utilized, such as skills-based routing or a priority scheme for preferred users.

Voice server 130 is used to play the constant repeated parts of an operator's speech, namely, the various greetings and signoffs (or closings). Server 130 is connected via data network 124 to switch host computer 128 and via one or more T1 spans to switch 114. Voice server 130 may comprise a general purpose computer and one or more voice cards for voice recognition, voice recording and playback, and call progress analysis. At appropriate stages in a call progression, switch host computer 128 initiates a voice path connection between voice server 130 and switch 114 such that the user, or the user and the operator, are able to hear whatever pre-recorded speech is played on that connection by voice server 130. Computer 128 then instructs voice server 130, via data network 124, what type of message to play, and passes data parameters that enable voice server 130 to locate the message appropriate to the call state.

Operators may utilize database server 126 to provide information assistance including searching for a user's desired party and determining the appropriate destination telephone number of the party. Other information assistance concerning restaurant recommendations, movie listings, events, etc. may also be provided by searching database server 126. In addition, information may be obtained through server 126 which indicates whether the actual telephone number of a researched party is to be disclosed when requested by a user or whether anonymity with respect to the telephone number should be maintained.

Figure 2:
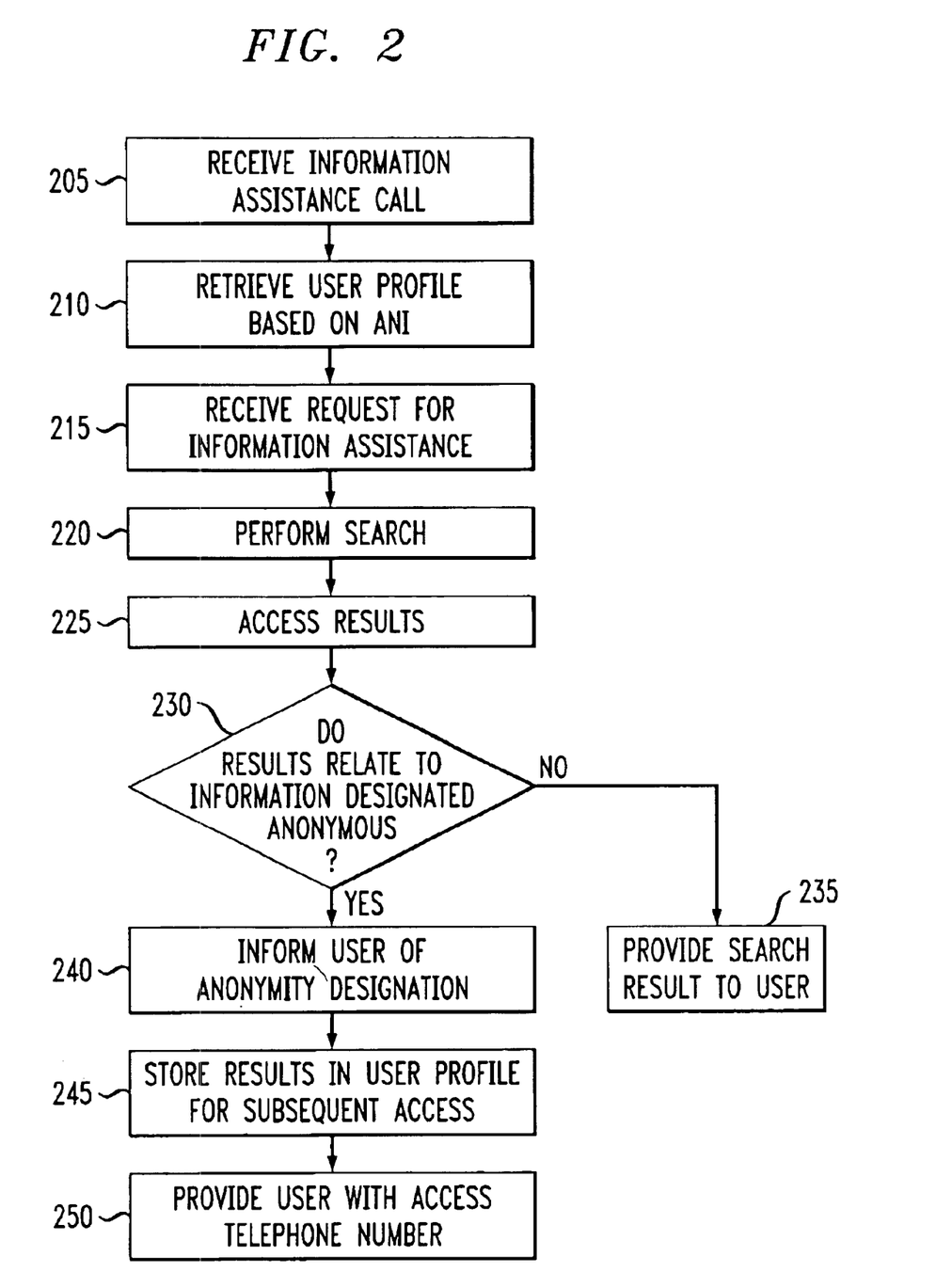
FIG. 2 is a flowchart depicting a routine for communicating anonymous call information to a user, in accordance with an embodiment of the invention.

For example, FIG. 2 provides a flowchart depicting a routine for providing anonymous call information to a user. At step 205, an information assistance call is received by system 100 via an inbound channel of one of T1 spans 112 at switch 114. The information assistance call may originate at virtually any communication device capable of communications with system 100, e.g., a wireless telephone, wireline telephone, personal digital assistant (PDA), mobile communications device, etc. In receiving the call, system 100 also receives call set-up signals containing data such as the user's automatic number identification (ANI). In an accordance with an embodiment of the invention, the ANI serves as an identifier of the user's device and may be used to store and associate a user profile containing the user's preferences with the user. The user profile is retrieved based on the ANI of the user's device (step 210) which is stored and maintained by a server, such as a user profile server (not shown) which is accessible via profile gateway 133. (Determining the ANI associated with a user's device, such as a user's SMS device or WAP-enabled device, is described more fully below with respect to FIGS. 5 and 6.)

At step 215, the operator who handles the call for directory assistance elicits, from the user, identification information (such as name and location) of a person or entity for which directory assistance information is desired. The operator then uses, e.g., database server 126 to search for results that matches the identification information provided by the user (step 220). In conducting the search, server 226 communicates with one or more directory assistance databases (not shown) to identify responsive search results and to access such results (step 225). Server 126 then causes the identified listings to be displayed on operator terminal 120 and for conveying to the user.

Upon identifying the search result that is desired by the user, the operator determines whether such result relates to connection information (e.g., a telephone number) that is designated anonymous (step 230). In accordance with an embodiment of the invention, a search result that contains anonymous information does not include the actual telephone number respecting the researched party on the operator's terminal. Rather, the display includes an access telephone number which is indicated as such. This indication serves as a notification to the operator that the result does not include the researched party's actual telephone number, but only an access telephone number for connection with the researched party. In accordance with an embodiment of the invention, the appropriate access telephone number is provided by the operator to the user to effectuate subsequent connection between the user and a researched party.

In another embodiment of the invention, the operator is provided with both an access telephone number and actual telephone number of the researched party. In such a circumstance, the operator is informed, by the display of the access telephone number, that the researched party's actual telephone number should not be provided to the user. Although the actual telephone number is not provided to the user, the number may be used by the operator to connect the user to the researched party. Thus, in such a situation the operator can provide the user with an access telephone number of a researched party (for subsequent use by the user in a manner described below) and the operator may also connect the user with the researched party using the researched party's undisclosed (that is, undisclosed to the user) actual telephone number.

In yet another embodiment, the operator has the ability to connect a user to a researched party without displaying the researched party's connection information to either the user or the operator. As such, a user may be connected to the researched party and may be provided with an access telephone number, without the risk that the operator may provide the researched party's actual connection information to the user.

If the desired search result does not relate to connection information that is designated anonymous, then the search results are conveyed to the user in a manner that is well known in the art—e.g., with the researched party's actual telephone number included (step 235).

If, however, the search result connection information desired by the user is designated anonymous, then the user is informed that the connection information that is available to the user does not include the researched party's actual telephone number, but an access telephone number instead (step 240). In such a case, data (such as, user data 300 described below with reference to FIG. 3) that is utilized to identify the researched party and to connect the user with the researched party, when the access telephone number is used, is stored in the user profile (step 245) for subsequent use. It should be noted that the access telephone number may be a toll free telephone number, or alternatively a local or long distance telephone number that is not toll free.

In accordance with an embodiment of the invention, such data storage is accomplished by associating a directory assistance information search result responsive to a user's search request with the user's ANI. The information assistance search result and user's ANI are stored in a user profile which is accessible to provider 103 for effectuating storage through profile gateway 133.

The user profile is maintained by one or more storage devices (not shown) which is centrally-located to information assistance service provider 103 and other providers (not shown). The associated data, which is derived from the search result and the user's ANI, is stored in a user profile as a record. As described further below, the result(s) that make up such a record include, in accordance with an embodiment of the invention, directory assistance information relating to one or more researched parties that have requested anonymity respecting its connection information.

Figure 3:
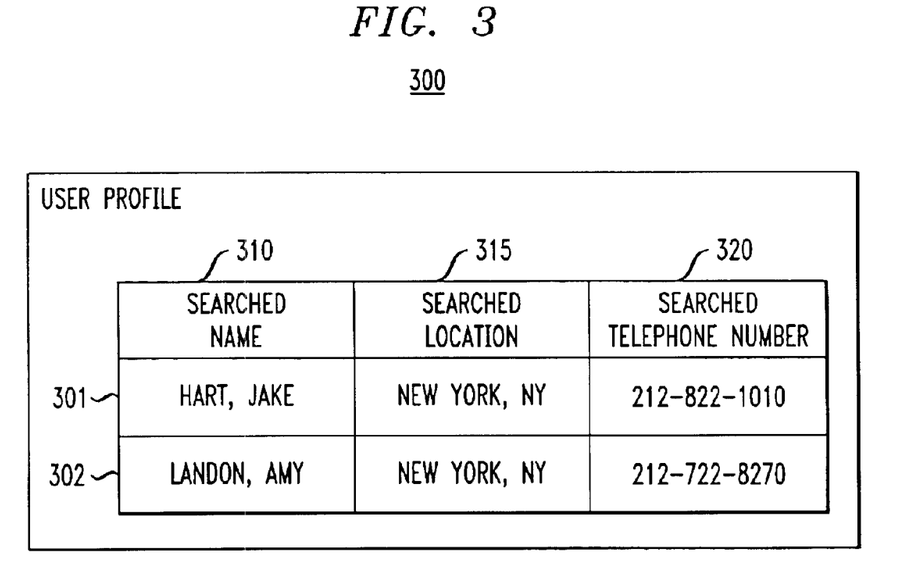
FIG. 3 illustrates a user profile in accordance with an embodiment of the invention.

FIG. 3 illustrates records stored by a user profile 300. In this example, user profile 300 contains search records 301 and 302, each of which includes, among other things, Searched Name Field 310 (e.g., last name, first name), Searched Location Field 315 (e.g., city, states) and Searched Telephone Number Field 320 of the researched party. This information is stored in centrally-located database(s). For example, information in fields 310 and 315 enable the user to identify, among a plurality of listed researched parties, which researched party is to be accessed when using an access telephone number (as described below with reference to FIG. 7). The searched telephone number in field 320 is associated with the researched party, and used to connect the user with the researched party when the user uses the access telephone number associated with the researched party for such connection (also described below with reference to FIG. 7).

Figure 4:
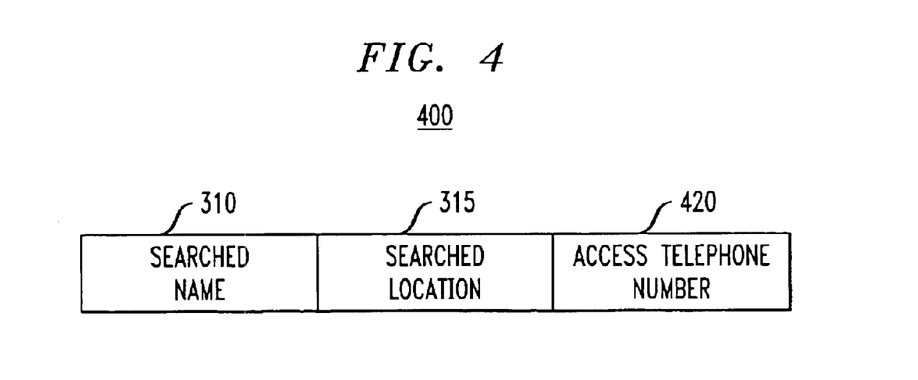
FIG. 4 illustrates data provided to a user accessing the system of FIG. 1, in accordance with an embodiment of the invention.

Returning to FIG. 2, in addition to storing the user's directory assistance search result(s) in the user profile 300 (step 245), the user is provided with information used to contact a researched party which is identified in response to a search request. The user is provided with, in accordance with an embodiment of the invention, information which identifies the researched party and an access telephone number (not the researched party's actual telephone number) to effectuate connection between the user and the researched party (step 250). FIG. 4, illustrates the data 400 that is provided to the user ("user data") in response to a request for directory assistance information respecting a researched party, wherein the researched party has requested anonymity with respect to its actual telephone number and some other connection information. This user data 400 includes name 310 and location 315 of the researched party and the access telephone number 420 for connecting with the researched party, not directly, but through information assistance service provider 103.

Figure 5:
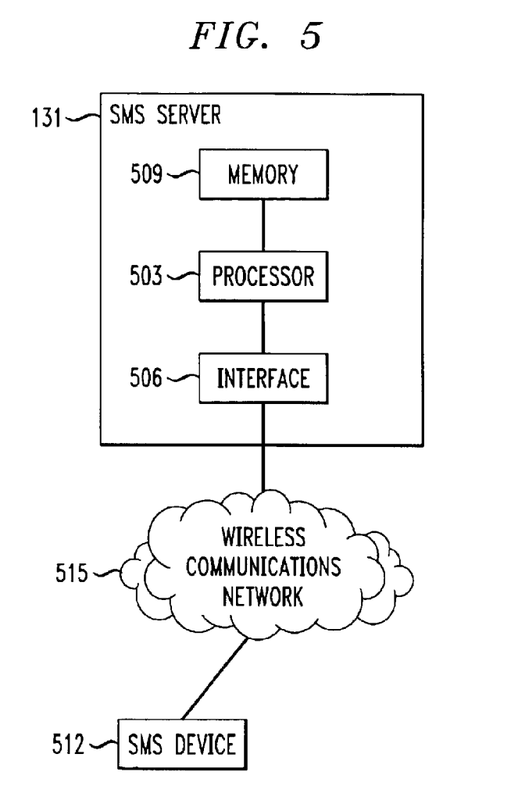
FIG. 5 illustrates an arrangement whereby anonymous call information is communicated to a user, in accordance with an embodiment of the invention.

One method of transmitting user data 400 to a user may be via SMS, as illustrated in FIG. 5. In such a case, the user may inform the operator that the user's communication device 512 being used for the call has an SMS capability. Alternatively, such a capability is specified in user profile 300 (not shown). When a user contacts system 100 using SMS device 512, switch host computer 128 retrieves the ANI from the device and transmits such information to each server and gateway, including profile gateway 133, which is in communication with data network 124. When such information is received by, for example, gateway 133, a user's profile is updated by storing the received ANI information (and, in some instances, the type of device associated with the ANI) in memory 509 of SMS server 131.

Accordingly, as illustrated in FIG. 5, the operator can cause processor 503 of SMS server 131 to access memory 509 to obtain the ANI indicating the telephone number of the user's SMS device 512, to which server 131 sends an SMS message. The SMS message includes the ANI, and the user data for one or more responsive search requests containing an access telephone number 420, via interface 506. As is well known, an SMS is a store and forward service where short messages are not sent directly from a sender to a recipient but rather via an SMS center. A conventional wireless communications network 515 that supports SMS has one or more SMS centers to handle and manage the short messages. The aforementioned SMS message containing user data 400 is transmitted, through one or more SMS centers, to the user's SMS device 512 identified by the ANI in the SMS message.

Figure 6:
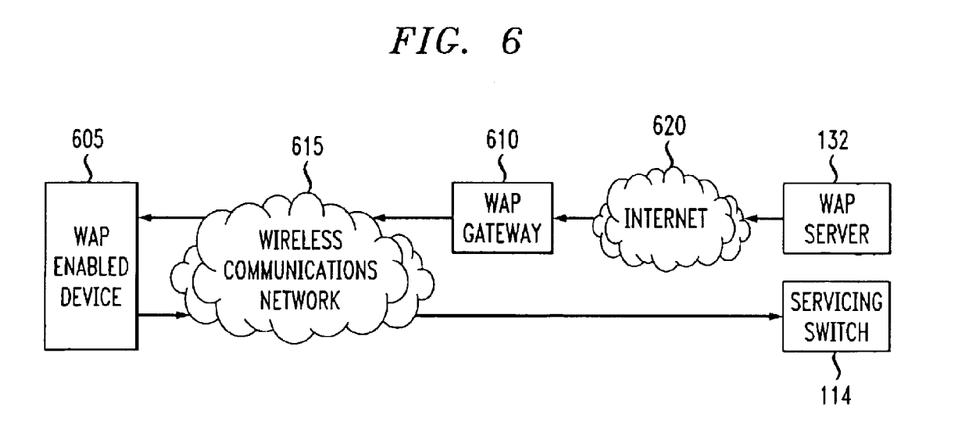
FIG. 6 illustrates an arrangement whereby anonymous call information is communicated to a user, in accordance with another embodiment of the invention.

Referring to FIG. 6, yet another method for transmitting user data 400 to a call may be via a WAP (wireless application protocol) site, in which case the user may inform the operator that the user's communication device 605 being used for the call is WAP enabled. Alternatively, such a capability is specified in user profile 300 (not shown). In such instances, the user may use WAP-enabled device 605 (e.g., a web-enabled wireless telephone) to access switch host computer 128 of system 100.

As is well known, to enable mobile devices to effectively access the Internet through a wireless communications network, such as network 615, which is not an ideal network for such access as it typically affords low bandwidth, high latency and unreliable connections, a WAP standard for the mobile devices has been developed to overcome the particular constraints of the wireless environment. For example, similar to the Internet standards, WAP specifies use of a wireless markup language (WML), which is a subset of an extensible markup language (XML), for writing WAP content. WML is designed to make optimum use of a small display which is typical of a mobile device. The resulting WAP content is scalable, e.g., from a two-line text display to a full graphic screen of a larger display. The WAP content can be read by a user using WAP microbrowser software installed in WAP-enabled device 605. The communications between the WAP-enabled device 605 and the Internet 620 is through a WAP gateway 610, which serves as an interface between a wireless communications network 615 and the Internet 620.

The WAP gateway 610 provides the necessary protocol translation (e.g., between WAP and transmission control protocol/Internet protocol (TCP/IP)) and optimization, security, activity tracking and administration. Messages communicated between device 605 and the WAP gateway 610 are in accordance with a WAP datagram protocol (WDP) and are identified by an IP address. In accordance with an embodiment of the invention, when a user accesses system 100 using WAP-enabled device 605, WAP server 128, via WAP gateway 610, identifies the ANI of the user's device from the IP address of the device or some other identifier received from the user (such as user's name, user ID, etc.). In another embodiment of the invention, IP address information that is provided by WAP device 605 may be applied to a translation table provided by a carrier (such as AT&T Wireless) to which the user of WAP-enabled device 605 subscribes. The results of such translation generates the ANI (or some other identifier) associated with the user's device.

Although the embodiments provided above are directed to transmitting user data 400 to a user's SMS device and WAP device, the transmission of user data to a user's facsimile, email, or pager, etc. may also be effectuated. The user may inform the operator of the facsimile number, email address, pager number, etc. to which user data 400 should be sent.

Figure 7:
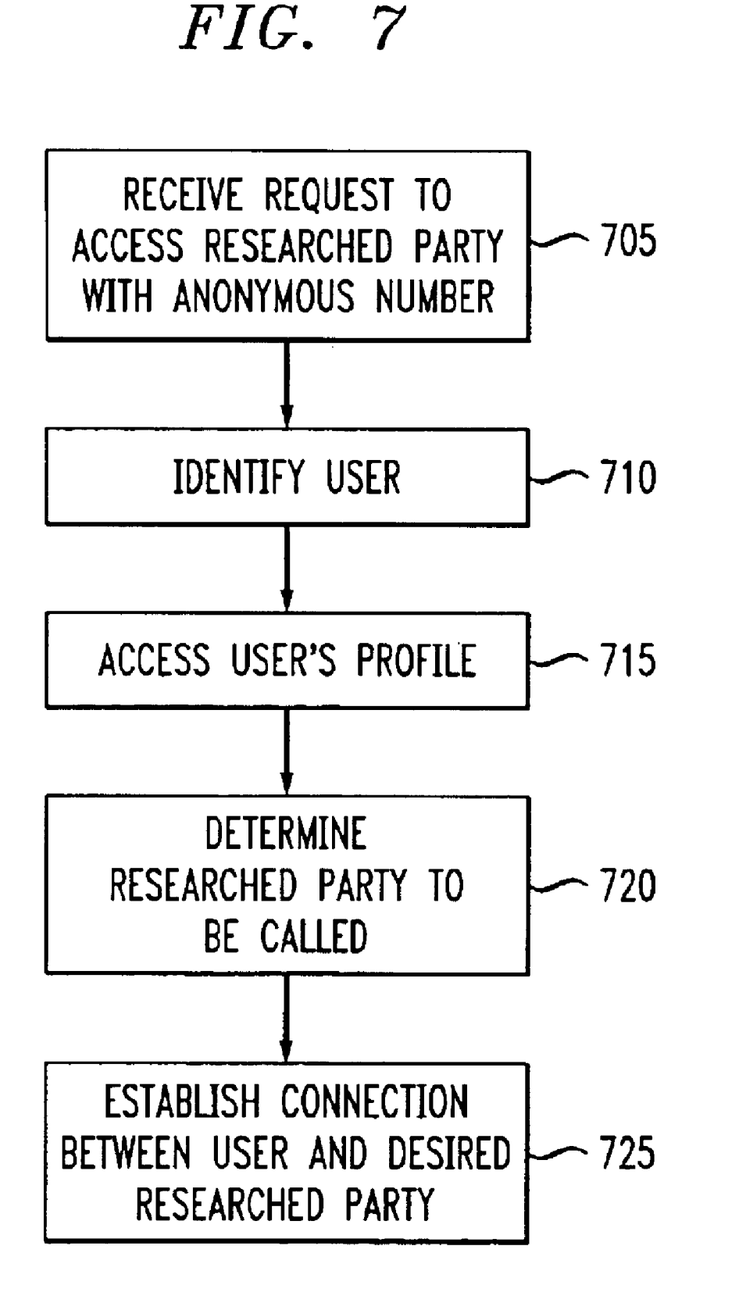
FIG. 7 is a flowchart depicting a routine for establishing a call between a user and a researched party, in accordance with an embodiment of the invention.

Once user data 400 is transmitted to a user's communication device (e.g., SMS device 512, WAP-enabled device 605, etc.), the user may use such information to establish a connection between the user and a desired researched party for which an access telephone number 420 has been associated. A process to establish such a connection is illustrated by the flowchart of FIG. 7. At step 705, a request to establish a connection with a researched party having anonymous connection information is received from a user. In an embodiment of the invention, such a request is recognized by switch host computer 128 when a user accesses system 100 using an access telephone number, such as access telephone number 420, which has been provided to a user in place of an actual telephone number 320 (or other connection information) in order to maintain anonymity of connection information. In accordance with an embodiment of the invention, this may be accomplished by accessing a dialed number identification string (DNIS) which accompanies a call received at the servicing platform 110. The DNIS identifies the number that the user dialed to access a communications system. Hence, although different numbers may be placed to platform service 110 to access various types of information system services provided by provider 103, the DNIS enables identification of which number was called for accessing system 100. When a call has been received from a user using access telephone number 420, computer 128 recognizes that the user is requesting assistance for establishing a connection with a researched party whose connection information is to be anonymous.

Upon determining that a user has accessed servicing platform 110 using access telephone number 420 (i.e., a telephone number dedicated to enabling connection between the user and a researched party having anonymous connection information), switch host computer 128 then identifies the user profile (step 710). This is accomplished, in accordance with an embodiment of the invention, by obtaining the ANI of the user's device and then accessing the user's user profile 300 (step 715) via profile gateway 133.

Upon accessing the user's user profile 300, the record(s) relating to the researched party or parties for which information assistance was sought and which connection information anonymity is desired are accessed. The appropriate record including Searched Telephone Number 320 is then selected by computer 128 to establish a connection by servicing switch 114 (of FIG. 1) between the user and the appropriate researched party (step 725).

If only one record (relating to one researched party) is stored in user profile 300 when the user accesses access telephone number 420, then the connection between the user and that researched party is automatically established, as there is only one possibility as to whom the user wishes to be connected. If, however, multiple records are stored by user profile 300, then the user is prompted for additional information to identify which researched party (and thus which record) should be accessed to establish a connection between the user and the desired researched party. For instance, in accordance with an embodiment of the invention, using IVR unit 134, the user may be prompted to spell (or provide the first few letters of) the name of the desired researched party. In accordance with another embodiment of the invention, IVR 134 may generate an audio listing of the researched party's that are available in a user's user profile for connection and can receive a tone from a user's device (in response to pressing a key on the device keypad) to access the appropriate party. In accordance with yet another embodiment of the invention, where for example WAP device 605 is used by a user, the user may access a display of a listing of researched parties (such as, records containing the fields of user data 400 illustrated in FIG. 4), highlight the record associated with the desired researched party and select such record to establish the connection between the user and the desired researched party. By providing information to computer 128 indicating the appropriate researched party for which a connection by the user is desired, the appropriate record from user profile 300 is selected and the appropriate researched party actual number is selected to connect the call.

The foregoing merely illustrates the principles of the invention. It will thus be appreciated that those skilled in the art will be able to devise numerous other arrangements which embody the principles of the invention and are thus within its spirit and scope. For example, several options may be provided by provider 103 in connection with the information assistance service described herein. Thus, system 100 may be configured to monitor the number of times that a user accesses a researched party whose connection information is anonymous using access telephone number 420. Such tracking information may be used to assess a fee to the user or the researched party or both for each connection attempted or made between the parties using access telephone number 420. In another embodiment of the invention, the user and/or researched party is assessed a fee when the information assistance request is made by the user.

In addition, the amount of time in which an access telephone number enables connection between the user and a researched party may be limited to a predetermined duration (e.g., two weeks). Upon expiration of such duration, the user would be required to submit an additional search request to reinstate the connection option using the access telephone number 420.

System 100 may also be configured such that a user can submit an identification number that is associated with the user which is different than the device that the user is using to access system 100. For example, suppose a user's user profile 300 contains a record associated with user's ANI, e.g., 2122361000, of a wireless device having SMS capability. The user in this instance may wish to subsequently access such a record using, e.g., his or her landline telephone. Because system 100 would not recognize a stored ANI from the landline telephone when the user accesses system 100 via access telephone number 420, computer 128 may be programmed such that if IVR unit 134 receives a tone associated with the pressing of a predetermined telephone keypad key (e.g., the "#" key) at any time during the user's session with system 100 initiated by a call using access telephone number 420, IVR unit 134 will then prompt the user to input the user's previously-stored ANI or other identification data stored in user profile 300. Thus, although the identification information of user's communications device may be different than the user identification information stored by user profile 300, the user may nevertheless access his or her records. A pre-recorded message respecting such an option may be provided to users (by, e.g., voice server 130) when they access system 100 using access telephone number 420. When exercising this option, the user may be prompted to provide a personal identification number, a password or some other form of information which may be used to verify that the user has the right to access a given user profile.

It should be noted that, although FIG. 1 illustrates access to system 100 through carrier networks in communication with servicing switch 114, access to system 100 may be made in other ways. For example, a user may access data network 124 via the Internet, a paging system or via some other data network.

Finally, information assistance system 100 is disclosed herein in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors.

What is claimed is:

1. A method for providing information assistance to a caller, comprising:

receiving a call from a caller, the call including a request for connection information concerning a researched party, wherein the connection information relates to the identification of a communications device associated with the researched party;

retrieving the connection information and access information in response to the request, wherein the access information enables the caller to effectuate a connection between the caller and the researched party through a provider of the information assistance;

transmitting to the caller the access information;

withholding from the caller the connection information;

storing the connection information in a record associated with the caller; and providing to the caller an option for selection of at least one of the record and any other records associated with the caller when the caller communicates using the access information.

2. The method of claim 1, wherein the connection information includes a telephone number associated with the researched party.

3. The method of claim 1, wherein the access information includes a telephone number.

4. The method of claim 1, wherein the access information is transmitted through a communication.

5. The method of claim 4, wherein the communication includes a short message service (SMS).

6. The method of claim 5, wherein a destination address of the communication is identified by an automatic number identification (ANI) of a communication device from which the call originates.

7. The method of claim 4, wherein the communication includes a facsimile transmission.

8. The method of claim 4, wherein the communication includes a communication pursuant to a wireless application protocol (WAP).

9. The method of claim 4, wherein the communication includes an email.

10. The method of claim 4, wherein the communication includes paging.

11. The method of claim 4, wherein the communication includes instant messaging.

12. The method of claim 4, wherein the communication includes a web connection.

13. The method of claim 1, wherein the record contains the connection information and the access information.

14. The method of claim 1, wherein the record is identifiable by an ANI of a communication device from which the call originates.

15. The method of claim 1, wherein the record is stored for a predetermined duration.

16. The method of claim 1, further comprising assessing a fee to the caller in response to receiving the request for said connection information.

17. The method of claim 1, further comprising assessing a fee to the researched party in response to receiving the request for said connection information.

18. A method for connecting a user to a researched party through a provider of information assistance, comprising:

providing, to the user, data concerning one or more researched parties whose connection information was previously requested by the user and undisclosed thereto by the provider;

receiving an identifier associated with the user, and a request from the user to establish a communications connection with one of the researched parties selectable by the user based on the data;

identifying connection information associated with a selected researched party, based on the identifier and the request; and attempting to connect the user with the selected researched party, using the connection information associated with the selected researched party.

19. The method of claim 18, wherein the connection information associated with the selected researched party includes a telephone number.

20. The method of claim 18, wherein the received request is transmitted through a communication.

21. The method of claim 20, wherein the communication includes a short message service (SMS).

22. The method of claim 20, wherein the communication includes a communication pursuant to a wireless application protocol (WAP).

23. The method of claim 20, wherein the communication includes a telephone connection.

24. The method of claim 18, wherein the data is stored in a device of the user.

25. The method of claim 18, wherein the identifier includes an ANI of a communication device from which the received request originates.

26. The method of claim 18, further comprising assessing a fee to the caller in response to receiving the request.

27. The method of claim 18, further comprising assessing a fee to the researched party in response to receiving the request.

28. A system for providing information assistance to a caller, comprising:

an interface for receiving a call from a caller, the call including a request for connection information concerning a researched party, wherein the connection information relates to the identification of a communications device associated with the researched party; and a processor programmed to retrieve the connection information and access information in response to the request, wherein the access information enables the caller to effectuate a connection between the caller and the researched party through a provider of the information assistance;

an output device for transmitting to the caller said access information, with said connection information withheld from the caller; and storage for storing the connection information in a record associated with the caller, the caller being provided with an option for selection of at least one of the record and any other records associated with the caller when the caller communicates using the access information.

29. The system of claim 28, wherein the connection information includes a telephone number associated with the researched party.

30. The system of claim 28, wherein the access information includes a telephone number.

31. The system of claim 28, wherein the access information is transmitted through a communication.

32. The system of claim 31, wherein the communication includes a short message service (SMS).

33. The system of claim 32, wherein a destination address of the communication is identified by an automatic number identification (ANI) of a communication device from which the call originates.

34. The system of claim 31, wherein the communication includes a facsimile transmission.

35. The system of claim 31, wherein the communication includes a communication pursuant to a wireless application protocol (WAP).

36. The system of claim 31, wherein the communication includes an email.

37. The system of claim 31, wherein the communication includes paging.

38. The system of claim 31, wherein the communication includes instant messaging.

39. The system of claim 31, wherein the communication includes a web connection.

40. The system of claim 28, wherein the record contains the connection information and the access information.

41. The system of claim 28, wherein the profile record is identifiable by an ANI of a communication device from which the call originates.

42. The system of claim 28, wherein the record is stored for a predetermined duration.

43. The system of claim 28, wherein a fee is assessed to the caller in response to receiving the request for said connection information.

44. The system of claim 28, wherein a fee is assessed to the researched party in response to receiving the request for said connection information.

45. A system for connecting a caller user to a researched party through a provider of information assistance, comprising:
   an output device for providing, to the user, data concerning one or more researched parties whose connection information was previously requested by the user and undisclosed thereto by the provider;
   an interface for receiving an identifier associated with the user and a request from the user to establish a communications connection with one of the researched parties selectable by the user based on the data; and
   a processor programmed to identify connection information associated with a selected researched party, based on the identifier and the request; and
   a mechanism for attempting to connect the caller with the researched party, using the connection information associated with the selected researched party.

46. The system of claim 45, wherein the connection information associated with the selected researched party includes a telephone number.

47. The system of claim 45, wherein the request received by the interface is transmitted through a communication.

48. The system of claim 47, wherein the communication includes a short message service (SMS).

49. The system of claim 47, wherein the communication includes a communication pursuant to a wireless application protocol (WAP).

50. The system of claim 47, wherein the communication includes a telephone connection.

51. The system of claim 45, wherein the data is stored in a device of the user.

52. The system of claim 45, wherein the identifier includes an ANI of a communication device from which the received request originates.

53. The system of claim 45, wherein a fee is assessed to the caller in response to receiving the request.

54. The system of claim 45, wherein a fee is assessed to the researched party in response to receiving the request.

55. The method of claim 18 wherein the data includes names of the one or more researched parties.

56. The method of claim 18 wherein the data includes locations of the one or more researched parties.

57. The method of claim 24 wherein the device of the user includes a wireless communication device.

58. The system of claim 45 wherein the data includes names of the one or more researched parties.

59. The system of claim 45 wherein the data includes locations of the one or more researched parties.

60. The system of claim 51 wherein the device of the user includes a wireless communication device.

* * * * *